United States Patent [19]

Schwarz

[11] 4,401,181

[45] Aug. 30, 1983

[54] ROAD VEHICLE CONTROL SYSTEM

[76] Inventor: Alfred V. Schwarz, P.O. Box 425, Winnipeg, Canada, R3C 2H6

[21] Appl. No.: 243,262

[22] Filed: Mar. 12, 1981

[51] Int. Cl.³ .......................... B60K 31/00; B62D 1/28
[52] U.S. Cl. .................................................... 180/168
[58] Field of Search ................ 180/167, 168; 318/587; 340/32, 61, 104, 114 R, 38 L, 38 R; 364/424, 447

[56] References Cited

U.S. PATENT DOCUMENTS

| | | | |
|---|---|---|---|
| 1,803,288 | 4/1931 | Adler, Jr. | 180/167 |
| 2,019,976 | 11/1935 | Huebscher | 180/167 |
| 2,750,583 | 6/1956 | McCullough | 180/168 |
| 3,085,646 | 4/1963 | Paufve | 180/168 |
| 3,431,996 | 3/1969 | Giles et al. | 180/168 |
| 3,556,244 | 1/1971 | Gray | 180/168 |
| 3,563,327 | 2/1971 | Mier | 180/168 |
| 3,575,255 | 4/1971 | Wickstrom | 180/168 |
| 3,609,678 | 9/1971 | Fayling | 340/32 |
| 3,642,087 | 2/1972 | Sampey | 180/168 |
| 3,653,456 | 4/1972 | Uemura | 180/168 |
| 3,669,208 | 6/1972 | Brooke | 180/168 |
| 3,837,756 | 9/1974 | Schwarz | 404/70 |
| 3,924,207 | 12/1975 | Simoni | 338/132 |
| 4,003,445 | 1/1977 | De Bruine | 180/168 |
| 4,310,862 | 1/1982 | Schwarz | 360/68 |

OTHER PUBLICATIONS

"Assembly and Operation of the Heathkit Stereo Preamplifier Model AP-1615," ©1975 by Heath Company, FIG. 4, p. 16, and Schematic (portion of).

Primary Examiner—Joseph F. Peters, Jr.
Assistant Examiner—Kenneth R. Rice
Attorney, Agent, or Firm—Merchant, Gould, Smith, Edell, Welter & Schmidt

[57] ABSTRACT

A motor vehicle guidance and control system for use with a roadway having marking elements, for example magnetic marking elements, which define the lanes of travel and also zones of lowered speed on the roadway. A plurality of sensors mounted on the motor vehicle detect proximity to the marking elements and a connected control means produces control signals corresponding to the position of the motor vehicle with respect to the lane of travel and also of the presence of a lowered speed zone. Indicating means provide visual and/or audible indication to the operator of the motor vehicle of any steering corrections that may be required to maintain the motor vehicle within the lane of travel, and of the presence of a lowered speed zone. Circuitry is provided for developing speed command signals for operating a steering servo and speed control commands to a speed servo. In one embodiment an array of four sensors is positioned along the width of the motor vehicle, and a variable connecting means is provided so that the left and right sensors can develop the steering signals for a roadway having lane-edge markers, or the center two sensors can provide steering signals for use on a roadway having lane-center marking elements.

13 Claims, 8 Drawing Figures

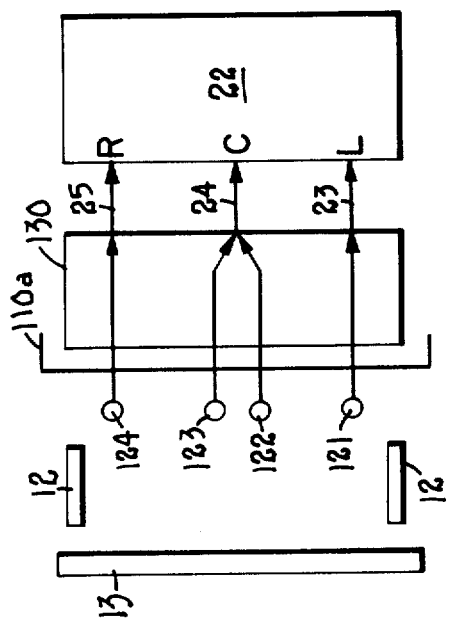
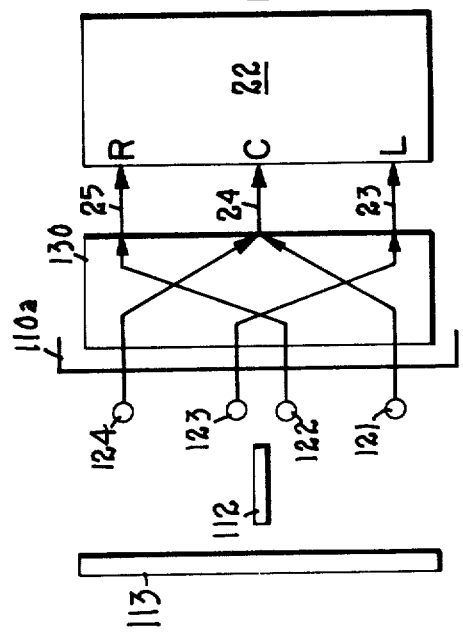
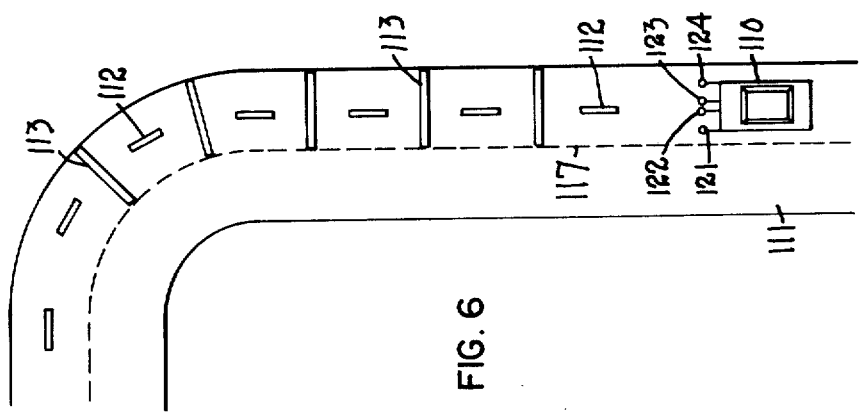

ROAD VEHICLE CONTROL SYSTEM

TECHNICAL FIELD OF THE INVENTION

This invention relates generally to motor vehicle guidance and control systems and specifically to systems having magnetic sensors and control circuitry on the motor vehicle for developing control signals from control devices placed along or embedded in the roadway over which the vehicle is traveling.

BACKGROUND OF THE INVENTION

Many systems have been proposed for the control of motor vehicles along a roadway through the use of sensors on the vehicle which cooperate with signal devices on the roadway for determining the position of the vehicle on the roadway. The signal devices on the roadway can take the form of electrical wires or magnetic material embedded in the roadway surface at predetermined locations, such as along the center of a lane, at the edges of a lane or some other predetermined location or pattern. The sensors are positioned on the vehicle to detect proximity to the signal areas of the roadway, as by a magnetic pickup for example, and the sensors therefore develop signals indicative of the position of the vehicle with respect to the predetermined signal area of the roadway. The prior systems use electronic controls which operate from the position signals to provide steering commands to automatically steer the car along the roadway. Such systems promise the potential of safer travel by reducing or eliminating accidents due to vehicles straying off the appropriate lane of travel and colliding with other vehicles or objects.

Despite the potential advantages of such systems, and despite the fact that a number of such systems have been proposed over a number of years in the prior art, motor vehicle guidance systems for roadways have not come into practical widespread use. It is believed that the reason such systems have not come into widespread use is because of their cost, both in terms of the signal devices for the roadway as well as the cost of the equipment for the vehicles, and also because of concern as to the complexity and reliability of the systems. My copending U.S. patent application Ser. No. 88,604, filed Oct. 26, 1979, now U.S. Pat. No. 4,310,862 discloses a relatively low cost but effective way of making magnetized control strips for roadways, and the present invention provides a simple, yet reliable and effective control apparatus for the moving vehicle to provide steering commands either to a driver or to an automatic steering servo system, as well as speed control signals to a driver or an automatic speed control when approaching speed zones, dangerous curves, and the like.

SUMMARY OF THE INVENTION

The present invention provides a motor vehicle control system for use with a roadway having a plurality of magnetic lane marking elements which are located in a pattern indicative of the center or the lateral edges of the lane, and of lower speed control zones such as curves or intersections in the roadway. Sensing means are attached to a motor vehicle for sensing the proximity of the lane marking elements and generating signals indicative of the position of the motor vehicle with respect to the lane of travel. These signals are received by a control means which is operative in response to the signals to produce control signals indicative of the position of the motor vehicle on the roadway and of the presence of any lower speed zone. Also included are indicating means which are operative in response to the control signals to produce an indication to the driver of any corrective action that needs to be taken in terms of steering inputs or speed reduction. The indicating means may be either an audible or visual alarm. In the preferred embodiment, the indicating means consists of four separate elements including a general alarm signal, a slow signal, a turn left signal and a turn right signal.

Guidance means are included and are operative in response to the control signals to produce a steering signal which may be input to a servo steering device. The servo steering device responds to the steering signal and automatically controls the path of the motor vehicle on the roadway. A signal output to an automatic speed control system commands a lower speed in a zone marked for lower speed.

According to one embodiment of the invention, an array of sensing means is positioned on the vehicle for sensing left and right magnetic land edge markers, and also another pair of sensing means is positioned for straddling magnetic center-of-lane markers. Connecting means, which may include switching means, are provided for connecting the sensing means to the various inputs of the control means so that the control system is easily adaptable to operating on roads with a lane-centers marker, or with roads having lane edge markers.

BRIEF DESCRIPTION OF THE DRAWINGS

FIG. 5 is an alternate embodiment for the Left and Right sensors;

FIG. 6 is a schematic plan view of a two lane roadway showing a different pattern of magnetic strips on the roadway surface and a vehicle equipped with an array of four sensing means;

FIG. 7 is block diagram showing the connection of the four sensor embodiment to the control means for use on a roadway having lane edge markers; and FIG. 8 is a block diagram similar to FIG. 7 showing the connection of the four sensor embodiment to the control means for use on a roadway having lane-center markings.

DETAILED DESCRIPTION OF THE INVENTION

Figure 1:
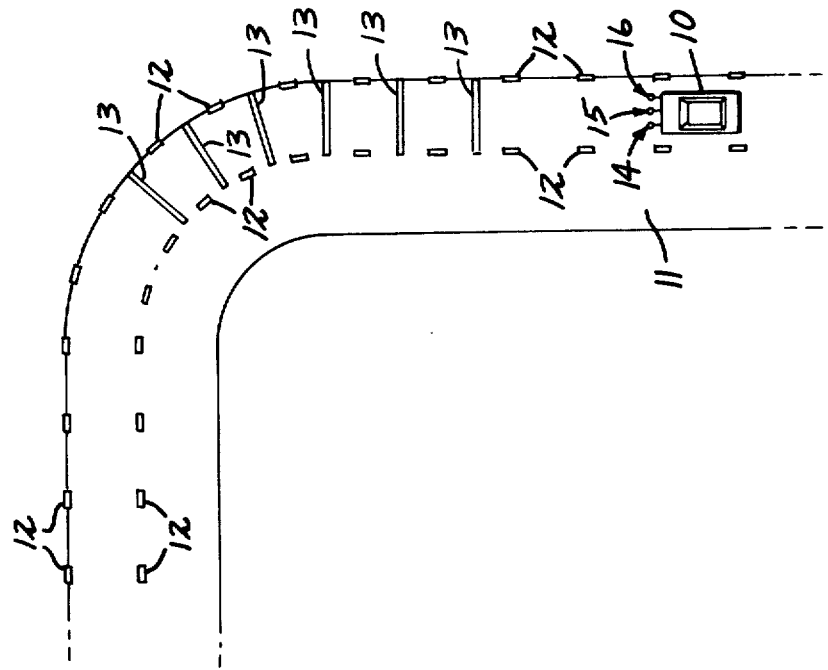
FIG. 1 is a schematic plan view of a two lane roadway showing the pattern of magnetic strips on the roadway surface and a vehicle equipped with sensing means.

With reference to FIG. 1, one embodiment of the invention can be seen as it is utilized with respect to a motor vehicle 10. The motor vehicle 10 travels down a roadway 11 which includes lateral lane edge marking elements 12 and transverse lane marking elements 13. Lane marking elements 12 and 13 are comprised of magnetic strips which are permanently affixed to or embedded within the surface of the roadway. A preferred technique for producing magnetized lane marking elements is disclosed in my co-pending U.S. patent application Ser. No. 88,604, filed Oct. 26, 1979, now U.S. Pat. No. 4,310,862. Mounted upon motor vehicle 10 are a left sensing element 14, a center sensing element 15 and a right sensing element 16. The sensing elements are operative to produce sensing signals whenever a given sensing element comes within close proximity of lane marking elements 12 or 13 in a manner which will be more fully described hereafter.

Figure 2:
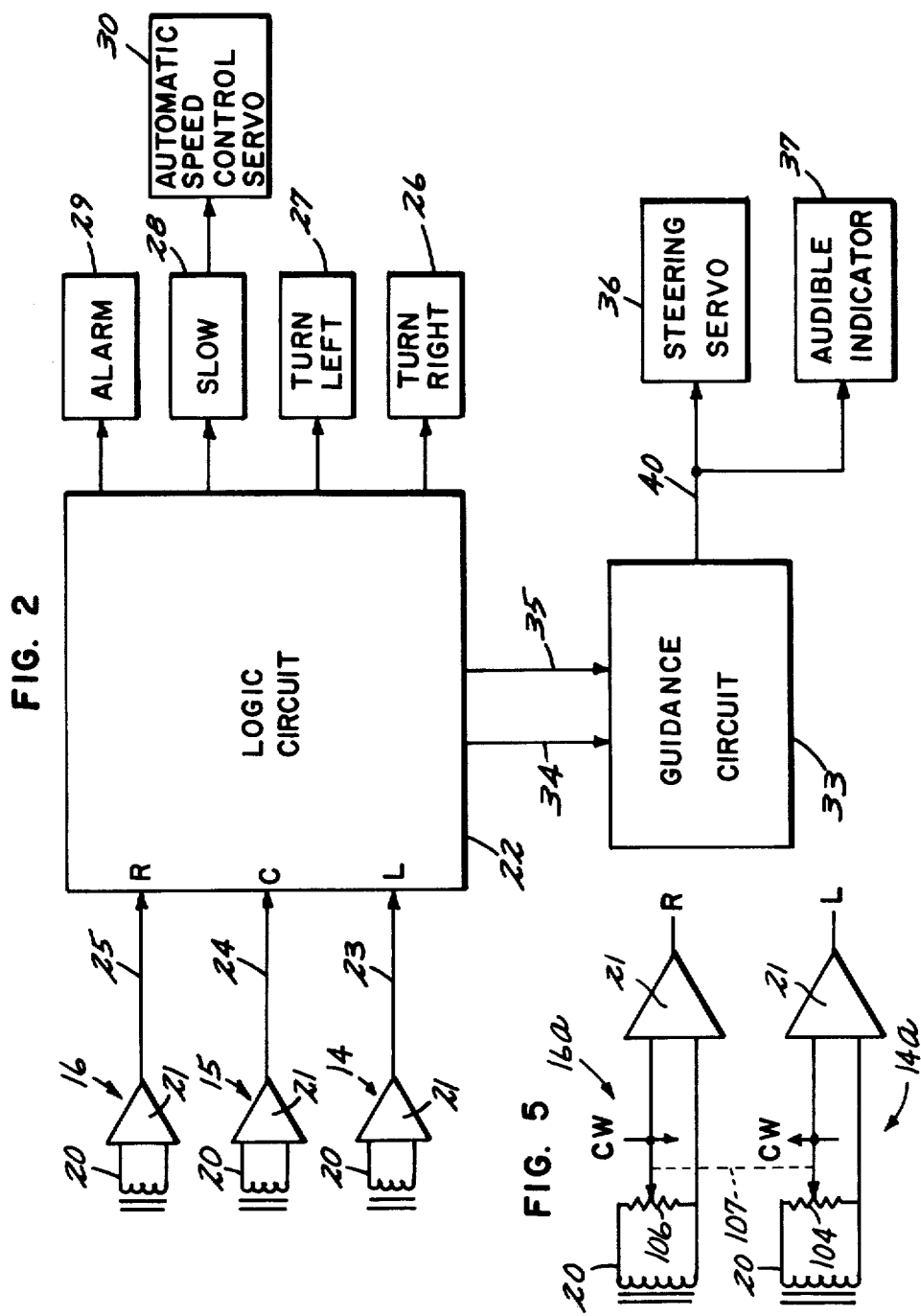
FIG. 2 is a block diagram showing the components of the motor vehicle guidance system according to the present invention.

In FIG. 2, sensing elements 14, 15, and 16 can be seen to be identically comprised of magnetic core elements 20 and amplifiers 21. Sensing elements 14, 15, and 16 are connected to logic control circuit 22 by means of leads 23, 24, and 25, respectively. Logic control circuit 22 is operative in response to the sensing signals received to activate the proper indicating devices 26 through 29 and optional automatic speed control servo 30 in a manner which will be more fully described hereafter. Indicating devices 26 through 29 indicate the necessity for turning right, turning left, slowing down or general alarm, respectively, and they may take the form of visual or audible indicators or both. In the preferred embodiment they may take the form of indicator lights.

Logic control circuit 22 is connected to guidance circuit 33 by means of leads 34 and 35. Guidance circuit 33, which is shown in detail in FIG. 4, utilizes the control signals transmitted on leads 34 and 35 to produce steering signals which are transmitted to a servo steering device 36 by way of lead 40. Also, the steering signals on lead 40 can be applied to an optional audible indicator 37 to indicate the amount of steering correction required.

Figure 3:
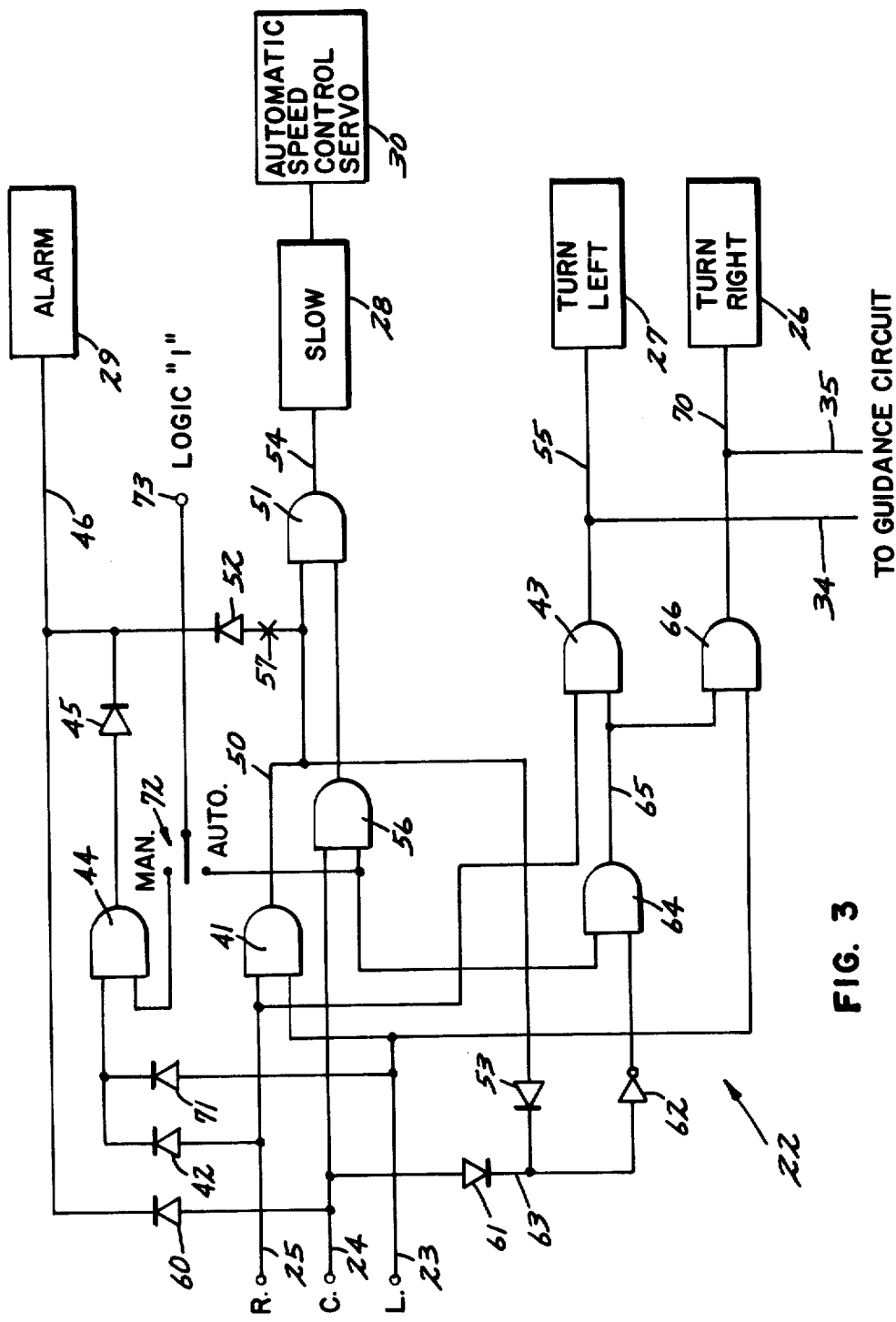
FIG. 3 is a schematic diagram of the logic circuit and indicting signals of FIG. 2.

FIG. 3 shows a schematic diagram of logic control circuit 22 and its connections to indicating lights 26 through 29. Lead 25 connects sensing signals from the right sensing element 16 to the "R" input of logic control circuit 22. Lead 25 connects to one input of an AND gate 41. Other branches of lead 25 connect to the anode of a diode 42 and to one of the inputs of an AND gate 43. The cathode of diode 42 connects to one of the inputs of AND gate 44 whose output is connected through diode 45 to "Alarm" indicating light 29 by way of lead 46. The output of AND gate 41 appears at least 50, a branch of which connects to one of the inputs of AND gate 51. Other branches of lead 50 connect to the anode of a diode 52 whose cathode connects to lead 46 and to the anode of a second diode 53. The output of AND gate 51 is connected to the "Slow" indicating light 28 by way of lead 54. The output of AND gate 43 is connected to the "Turn Left" indicating light 27 through lead 55.

Lead 24 connects the output of the center sensing element 15 to the "C" input of logic control circuit 22. The "C" designation stands for "common" or, in this case "center" and refers to the fact that signals applied to this input are from transverse lane marking elements 13, and apply to the operation of the vehicle as a whole, rather than to left or right steering commands. In the case of the embodiment of FIG. 1 which has three sensors on the vehicle, the common input signal is also from the center sensor 15, but this is not necessarily always the case, as explained further with respect to the embodiment of FIGS. 6, 7, and 8, below. Lead 24 connects to one of the inputs of an AND gate 56 and also to the anodes of two diodes 60 and 61. The cathode of diode 60 connects to lead 46. The cathode of diode 61 is connected to the cathode of diode 53 and the input of an inverter 62 through branches of lead 63. The output of inverter 62 is connected to one of the inputs of an AND gate 64 whose output appears at lead 65. One branch of lead 65 connects to an input of AND gate 43 and another branch connects to an input of AND gate 66. The output of AND gate 66 is connected to the "Turn Right" indicating light 26 through lead 70.

Sensing signals from the left sensing element 14 are connected to the "L" input of logic control circuit 22 through lead 23. Lead 23 connects to the anode of a diode 71, to one of the inputs of AND gate 41 and to one of the inputs of AND gate 66. The cathode of diode 71 is connected to the cathode of diode 42 and to one of the inputs of AND gate 44.

A switch 72 connects a logic 1 source 73 to either an input of AND gate 44 in "MANUAL" position or inputs of AND gates 56 and 64 in "AUTO" position. This allows logic control circuit 22 to be operated in either a manual or automatic mode as described more fully hereafter.

Figure 4:
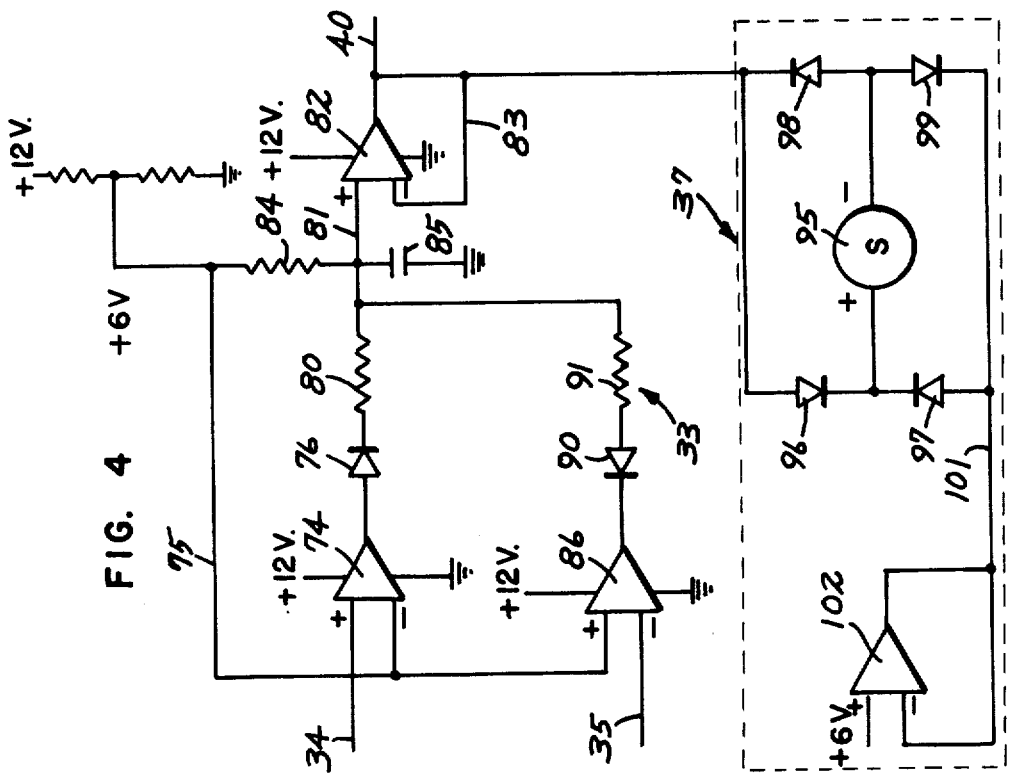
FIG. 4 is a schematic diagram of the guidance circuit of FIG. 2.

Leads 34 and 35 connect the outputs of AND gates 43 and 66, respectively to guidance control circuit 33 as seen in FIGS. 3 and 4. With reference to FIG. 4, it can be seen that lead 34 connects to the non-inverting input of an amplifier 74. The inverting input of amplifier 74 is connected to a six volt reference through lead 75. The output of amplifier 74 connects through a diode 76 and a resistor 80 to lead 81, a branch of which connects to the non-inverting input of a amplifier 82. The output of amplifier 82 is fed back to its inverting input by way of lead 83 so that amplifier 82 is a unity-gain current amplifier. Lead 81 is connected to the six volt source through resistor 84 and to capacitor 85 whose other side connects to signal ground. Amplifiers 74, 86 and 82 are connected to a 12 volt source of operating voltage, and the 6 volt reference can be derived from the 12 volt source by a resistor voltage divider as shown.

Lead 35 is connected to the inverting input of an amplifier 86. The non-inverting input of amplifier 86 is connected to lead 75. The output of amplifier 86 connects to the cathode of a diode 90. The anode of diode 90 is connected to lead 81 through resistor 91. The output of guidance control circuit 33 appears at lead 40. The signal at lead 40 may be input to a servo steering device 36 as shown in FIG. 2 which is capable of automatically steering the motor vehicle.

An optional audible indicator 37 can be connected to a branch of lead 40 as follows. A "sonalert" transducer 95 is connected to a diode bridge consisting of diodes 96-99. One side of the bridge, consisting of the anode of diode 96 and the cathode of diode 98, is connected to a branch of lead 40. The other side of the bridge, consisting of the anode of diode 97 and the cathode of diode 99, is connected to a six volt reference at lead 101. This reference voltage may be developed in any known way, for example, by connecting a regulated six volt supply through a unity gain buffer amplifier 102.

The operation of the control system is as follows. As motor vehicle 10 travels down roadway 11 in FIG. 1, whenever sensing elements 14, 15, or 16 come within close proximity of a magnetic lane marking element 12 or 13, magnetic flux will be picked up its core 20 and a sensing signal will be generated in its coil. The sensing signal is then amplified by the corresponding amplifier 21 which produces a logical 1 output signal if the sensing signal is at sufficient magnitude. The resultant effect is that a logical 1 is produced whenever one of the sensing elements 14 through 16 crosses over one of the magnetically treated lane marking elements 12 or 13. For example, should motor vehicle 10 turn to the right, right sensing element 16 will sense lane marking elements 12 as it passes over them. Thus, a series of logical 1's would be produced on lead 25 corresponding to the lateral lane marking elements 12 that are passed. Should motor vehicle 10 turn to the left, the logical 1's will appear on lead 23. Transverse lane marking elements 13 are placed across the entire lane and indicate that a lower speed zone, such as for a sharp curve or intersection, is being approached. When elements 13 are crossed by the vehicle, each one of sensing elements 14, 15, and 16 will generate a logical 1 at output leads 23 through 25, respectively.

With reference to FIG. 3, it can be seen that logic control circuit 22 may be set in either a manual or an automatic mode depending upon the position of switch 72. The circuit is in the manual position if switch 72 is set so that the logic 1 source 73 is connected to the input of AND gate 44. The circuit is in the automatic position when switch 72 is set such that the logic 1 source 73 is connected to the input of AND gate 56.

When switch 72 is set in the manual position, it can be seen in FIG. 3 that a logical 1 signal on any of leads 23, 24, or 25 will activate alarm indicating light 29. For example, if a logical 1 signal appears at either sensing lead 23 or sensing lead 25, it will appear at the top input of AND gate 44. A logical 1 is also applied constantly to the lower input of AND gate 44 through switch 72 so that the output is a logical 1. This passes through diode 45 and through lead 46 to alarm indicating light 29. Should a logical 1 appear at the "C" input, lead 24, from the center sensing element 15, it will pass directly through diode 60 to alarm indicating light 29 by way of lead 46. Thus, any combination of sensing signals will activate alarm indicating light 29 when switch 72 is in the manual position. Indicators 26, 27, and 28 are inhibited by the logic in manual position and do not respond to any combinations of left, right, or center signals. Switch 72 would be in the manual position for most in-town situations.

With switch 72 in the automatic position, alarm indicating lights 26, 27, and 28 may be activated under the proper circumstances. For example, should motor vehicle 10 deviate slightly to the right so that right sensing element 16 passes over a lateral lane marking element 12, a logical 1 signal will appear on lead 25. This places a logical 1 at one input of AND gate 43. Assuming the vehicle is not also crossing a transverse marker 13, a logical 0 is present on leads 23 and 24, and this causes inverter 62 to apply a logical 1 one input of AND gate 64. The other input to AND gate 64 is also at a logical 1 since it is connected to logical 1 source 73. Therefore, the output of AND gate 64 is at logical 1, causing a logical 1 signal to appear at the output of AND gate 43. This activates the left turn indicating light 27.

By a similar analysis it can be seen that logical 1 sensing signals being received on lead 23 from left sensing element 14 will produce a logical 1 on lead 70 which activates the turn right indicating light 26.

Should motor vehicle 10 approach a section of the roadway marked with transverse lane marking elements 13, logical 1 signals will simultaneously appear at each of leads 23, 24, and 25. Transverse lane marking elements 13 are used to signal a reduced speed or danger zone such as a sharp curve or intersection. With reference to FIG. 3, it can be seen that a logical 1 appearing at the "C" input, lead 24, from center sensing element 15 will be inverted by inverter 62 and appear at the lower input of AND gate 64 as a logical 0, thus inhibiting both gates 43 and 66 and the left and right indicators 26 and 27. This prevents the L and R signals from activating TURN RIGHT or TURN LEFT indications, respectively, since the L and R signals were the result of crossing a transverse marker 13, and not the result of the car deviating laterally in the roadway. Leads 23 and 25 apply logical 1's to AND gate 41 and thus a logical 1 appears on output lead 50 which connects to one input of AND gate 51. Lead 24 from the center sensing element 15 and the logic 1 from source 73 cause gate 56 to apply a logical 1 to the other input of gate 51, causing a logical 1 to appear on lead 54 thus activating the slow indicating light 28. The signal on lead 54 can also be applied to an automatic speed control servo 30 for the vehicle, which can be programmed to reduce the speed of the vehicle automatically from a high cruising speed to a lower speed for the duration of the zone marked by transverse markers 13.

The crossing of the transverse lane marking elements 13 will also activate alarm indicator 29, either through the signal path from the "C" input through lead 24 and diode 60, or the "L" and "R" signal from gate 41 through diode 52. Optionally, it may be desirable in some circumstances to delete the connection from gate 41 through diode 52 to the alarm 29, and this is indicated in FIG. 3 by the X marking, reference number 57. This would prevent simultaneous Left and Right signals from activating the alarm. This disconnection would be used for certain roadway marking patterns that would have the effect of creating equal L and R signals to control the vehicle's path down the center of a lane. In such a system the equal L and R signals would indicate proper location of the vehicle, not a low speed or alarm situation. However, the signal at lead 24 would continue to give the alarm for a low speed or danger zone, since the transverse marker 13 would be picked up by the center sensor 15, and the signal would be transmitted through diode 60 to the alarm indicator 29.

Also, in the event that the vehicle should drift toward the right or the left and if the left or right sensor or associated circuitry were to fail, the center sensor 15 would provide a backup alarm when the car moved sufficiently laterally that the center sensor would pick up the left or right lane divider marker 12.

The logical 1 signals appearing on leads 55 and 70 are transmitted to guidance control circuit 33 by way of leads 34 and 35, respectively. With reference to FIG. 4, the voltage at leads 81 and 40 is normally +6 volts in the absence of input pulses, due to the bias provided from the 6 volt reference. As motor vehicle 10 approaches the right lateral lane marking elements 12, logic control circuit 22 causes positive pulses to occur on lead 34. Each pulse causes the output of amplifier 74 to go to its full output of +12 volts. This causes diode 76 to conduct passing current through resistor 80 and causing capacitor 85 to begin to charge from +6 volts towards a more positive value. As more magnetic lateral lane marking elements 12 are passed, more pulses will be generated to charge capacitor 85 and thus the voltage across capacitor 85 will approach closer to 12 volts. This voltage appears at lead 81 and is input to the positive input of unity gain current amplifier 82.

As the motor vehicle approaches the left lateral lane marking elements 12, logic control circuit 22 causes positive pulses to appear on lead 35. These pulses are connected to the inverting input of amplifier 86 causing its output to go to 0 volts. This allows diode 90 to conduct current through resistor 91 from lead 81. This discharges capacitor 85 and lowers the voltage at lead 81 from +6 volts towards 0 volts. Thus, as more marking elements are passed, the voltage across capacitor 85 will approach closer to 0 volts.

The steering signals from lead 81 are passed through unity gain current amplifier 82 and are applied to a servo for controlling the steering of the vehicle. The design of stering servos is known in the art and is not set forth in detail here. The servo steering device 36 shown in FIG. 2 is designed to accept inputs such that +12 volts equals full left, 0 volts equals full right, and +6 volts equals no steering correction. Of course the particular voltages used for the steering commands are not critical, but could be changed by simple circuit changes. For example, 0 could equal no change, with + and − indicating turns. The input of the steering servo would be changed accordingly.

The time constants between resistors 80 and 91 and capacitor 85 control the amount of immediate correction per positive pulse. The time constant between resistor 84 and capacitor 85 controls the recovery time between the last pulse and the straight ahead condition.

The optional audible indicator 37 operates from the steering signals as follows. When the vehicle is properly positioned laterally on the road and no steering correction is called for, the signal at lead 40 of FIG. 4 will be +6 volts. The audible indicator circuit 37 is designed under those conditions to produce no audible output. The sound transducer 95 then receives no voltage differential, since the 6 volt signal at lead 40 is matched by the 6 volt reference at lead 101. The sound transducer 95 will produce a sound with increasing loudness as the signal voltage at lead 40 deviates in either direction from the +6 reference by increasing amounts. The sound transducer 95 thus produces an audible indication, in terms of the loudness of the sound, of the degree of steering correction required, and this in turn provides another type of warning indication to the vehicle operator. It will be appreciated that in the event that the guidance circuit 33 is designed to operate at different reference voltages or polarities, circuit 37 would be designed accordingly to still achieve the above-described operation.

An optional embodiment for the left and right sensors is shown in FIG. 5. In FIG. 5 the alternate left sensor 14A and alternate right sensor 16A are shown. They are in most respects similar to sensors 14 and 16 of FIG. 2, but with the addition of potentiometers 104 and 106, respectively. With reference to left sensor 14A, potentiometer 104 is connected across the coil 20 of the sensing core. The variable tap of the potentiometer 104 connects to the amplifier 21. By adjusting the position of the variable tap of the potentiometer, the gain or sensitivity of the sensor is adjusted. Sensor 16A is similarly connected with potentiometer 106.

Potentiometers 104 and 106 are preferably linear taper sharing a common shaft or other mechanical actuation as indicated by broken line 107. They are arranged so that with clockwise rotation of the shaft, potentiometer 106 is moved towards it minimum output, while potentiometer 104 moves towards its maximum output. The converse occurs with counterclockwise movement.

These potentiometers allow for adjusting the system to keep the vehicle at equal distances from the lane edge markers should the magnetic strengths of the markers be different. In this regard, the controls can be thought of as a balance or offset control to fine tune the centering of the vehicle on the lane. This alternate embodiment of FIG. 5 would not be used if the magnetic marker were down the center of the lane, but may be of advantage where the magnetic lateral lane markers coincide with the visible lane dividers.

Referring now to FIG. 6, there is shown an alternate embodiment of the invention utilizing an array of a plurality of sensors of the vehicle which can be connected in different patterns to enable the vehicle to operate on roadways having different types of lane markings. In FIG. 6, vehicle 110 has four such sensors numbered 121 through 124. Sensor 121 is on the left side of the vehicle and sensor 124 is on the right side of the vehicle. These sensors correspond respectively to sensors 14 and 16 of vehicle 10 of FIG. 1. Sensors 122 and 123 are located more centrally of vehicle 110, being spaced apart on either side of center with respect to vehicle 110.

Roadway 111 of FIG. 6 is a two lane highway and vehicle 110 is shown traveling down one of the lanes. Dotted line 117 indicates the center of the roadway dividing the lanes, but in the embodiment of FIG. 6 dotted line 117 is not a magnetic marker. Instead, the lanes are indicated by lane-center markers 112 which are positioned to run down the center of the lane of travel. There would be corresponding markers in the center of the other lane of roadway 111, but these have been omitted for purposes of clarity in FIG. 6. Markers 112 are analogous to markers 12 of FIG. 1 in that they define the lane of travel but instead of marking the edges of the lane as in FIG. 1, markers 112 mark the center of the lane. Transverse markers 113 are substantially identical to transverse markers 13 of FIG. 1, and serve the same purpose which is to mark zones for a lower speed zone. As vehicle 110 proceeds down the lane of travel it is positioned laterally of the lane so that sensors 122 and 123 bracket or straddle the center of the lane as defined by magnetic markers 112.

Use of the array of sensors, numbering four in the example shown in FIG. 6, permits the vehicle and control system to be operated either on a lane-center marked roadway as in FIG. 6, or on a lane-edge marked roadway as in FIG. 1. FIG. 7 shows the connection of the sensors to the control system of FIG. 2 for use on a lane-edge marked roadway as in FIG. 1. In FIG. 7, reference 110a indicates the front portion of vehicle 110, and sensors 121 through 124 are spaced along the vehicle as previously described, to represent a plan view when viewed from the top. Magnetic marking elements 112 are spaced along the left and right hand margins of the lane, and transverse marker 13 extends across the lane as previously described with respect to FIG. 1. A connecting means 130 is provided for connecting sensors 121-124 to the inputs of logic circuit 22. Connecting means 130 could take the form a terminal strip in which the necessary wiring connections are made to adapt the control system to one roadway marking system or the other or alternatively, connecting means 130 could comprise switching means whereby the vehicle-mounted control system can be configured for one roadway system or the other by actuation of the switch. In FIG. 7, connecting means 130 is configured to apply signals from sensor 124 to the "R" input of logic circuit 22 via lead 25. Sensor 121 is connected to connecting means 130 to lead 23 to the "L" input. This corresponds to the connection of sensors 16 and 14 to the "R" and "L" inputs, respectively, for the embodiment of FIGS. 1 and 2 previously described. The center or common input "C" receives signals from both sensors 123 and 122. Connecting means 130 connects both of these sensors to lead 24 to the "C" input. This connection can be a series one or a parallel one. If sensors 122 and 123 are connected in series, greater sensitivity will result, but requires somewhat more complex switching. A parallel connection of sensors 122 and 123 give somewhat lower sensitivity, but similar and perhaps more reliable switching. If the connection changes are made on a terminal strip for connecting means 130, a series connection of sensors 122 and 123 would be preferred. Control circuit 22 connects to the guidance circuit alarms and indicator in the same manner as previously described with respect to FIG. 2, but these connections are omitted from FIG. 6 for purposes of clarity.

In operation, the embodiment of FIG. 7 operates the same as the embodiment of FIGS. 1 and 2 previously described. Sensor 121 provides steering signals to the "L" input, sensor 124 provide steering signals to the "R" input, and sensor 122 and 123 jointly provide common signals from the transverse markers 13 to the "C" input.

In the embodiment of FIG. 8, connecting means 130 has been rewired or switched to permit operation of the vehicle on a lane-center marked roadway as in FIG. 6. In this configuration, sensor 122 picks up signals from magnetic markers 112 when the vehicle has moved too far to the right, and sensor 122 is connected to the "R" input of control logic 22. Sensor 123 senses when the vehicle has moved too far to the left, and its is connected through connecting means 130 and lead 23 to the "L" input. Sensors 121 and 124 are both connected by connecting means 130 to lead 24 to the "C" input. These sensors jointly detect crossing of transverse markers 113, ansd in a back-up mode in the event of failure of one of sensors 122 or 123, would detect crossing of the lane center markers 112. Sensors 121 and 124 can be connected in series or parallel to the "C" input in the same manner that was described above with respect to sensors 122 and 123 in FIG. 7. The design of a suitable switch or switching network for connecting means 130 is within the skill of those in the art, and could be implemented through switches, relays or solid state switching. Depending upon whether serial or parallel connections are used, the switching could be upstream or downstream of the of the amplifiers 21 that would be provided for each sensor, as would be apparent to those skilled in the art.

In the operation of the embodiment of FIG. 8, sensors 122 and 123 provide the steering commands, and sensors 121 and 124 provide the low speed control commands when the car travels into a zone marked by transverse markers 113. The rest of the control system from logic circuit 122 through the guidance, steering servo, audible indicator and various alarm and indicator functions is exactly the same as previously described above with reference to FIGS. 2 and 3. The four-sensor embodiment of FIGS. 6, 7 and 8 thus provides a convenient means for adapting or reconfiguring the control system for use on different road marking systems.

Although FIG. 6 shows the lane marking elements in the center of the lane of travel, it will be appreciated that they could be offset from center by a predetermined distance, and the two center sensors on the vehicle would be positioned accordingly to place the vehicle at the desired position in the lane. Also, the sensors do not have to be at the front of the vehicle as shown in the drawings. They could be placed elsewhere on the vehicle, for example beneath it, spaced laterally of the vehicle as described.

The sensitivity adjustment technique described above with reference to FIG. 5 is also applicable to the embodiment of FIGS. 6, 7, and 8. The adjustment would be applied to sensors 121 and 124 for lane-edge marked roadways, and sensors 122 and 123 for lane-center marked roadways, for centering the vehicle in the lane of travel.

Thus the present invention provides a control system having manual and automatic modes, for providing warning, steering, and speed signals for control of a vehicle trveling along a roadway.

What is claimed is:

1. A motor vehicle guidance system for use on a roadway having a plurality of marking elements indicative of the position of the lanes of travel for vehicles using the roadway and indicative of lowered speed zones in the roadway, the motor vehicle guidance system comprising:

sensing means attached to said motor vehicle for sensing said lane marking elements and generating sensing signals indicative of the proximity of the vehicle to the marking elements;

control means operative in response to said sensing signal to produce control signals corresponding to the position of the motor vehicle with respect to the lane of travel and of the presence of a lowered speed zone;

indicating means operative in response to said control signal to produce an indication to the motor vehicle operator of corrective steering required to maintain the motor vehicle within the lane of travel on said roadway, and of the presence of a lowered speed zone;

guidance means operative in response to said control signals to produce a steering signal indicative of the direction and amount of steering correction required to keep the vehicle in the lane of travel; and audible indicating means responsive to said steering signal to produce an audible signal whose volume is indicative of the amount of steering correction required to keep the vehicle in the lane of travel.

2. A motor vehicle guidance system according to claim 1 further comprising servo steering means operative in response to said steering signal to steer the motor vehicle.

3. A motor vehicle guidance system according to claim 1 further including vehicle automatic speed control means normally operative to maintain the vehicle at a preselected speed, and operative in response to control signals from said control means to lower the speed of the vehicle in the presence of a detected lowered speed zone.

4. A motor vehicle guidance system according to claim 1 including audible indicator means operably connected to said guidance means for producing an audible signal whose loudness is indicative of the amount of steering correction required to maintain the vehicle within the lane of travel of the roadway.

5. A motor vehicle guidance system as defined in claim 1 further comprising switching means operative to switch said control means to a manual mode in which said control means produces control signals which cause said indicating means to produce indication that the motor vehicle requires a correction in course or speed, or to an automatic mode in which said control means produces control signals causing said indicating means to produce a specific indication that the motor vehicle's course must be corrected to either the right or the left to maintain the vehicle in the lane of travel or that the speed of the motor vehicle must be reduced.

6. A motor vehicle guidance system for use on a roadway having a plurality of lane marking elements comprising magnetic elements affixed generally centrally of the lane of travel and extending along the lane of travel, and transverse magnetic elements affixed across the width of the lane of travel to indicate a lower speed zone, the guidance system comprising:
- sensing means comprising a first sensing element located along the left side of the motor vehicle, a second sensing element located along the right side of the motor vehicle, and third and fourth sensing elements located on the motor vehicle intermediate said first and second sensors and spaced laterally from one another for bracketing or straddling the magnetic elements extending along the lane when the motor vehicle is properly positioned therein, said sensing means operative to sense the proximity of said marking elements in the roadway and to generate sensing signals indicative thereof;
- control means operative in response to sensing signals from said third and fourth sensing elements to produce control signals indicative of the position of the motor vehicle within the lane and operative in response to sensing signals from said first and second sensing elements to produce control signals indicative of the presence of a lowered speed zone;
- indicating means operative in response to said control signals to produce an indication to the vehicle operator of corrective steering required to maintain the motor vehicle within said lane and of the presence of a lowered speed zone; and
- guidance means operative in response to said control signals to produce steering command signals.

7. A motor vehicle guidance system according to claim 6 wherein said third and fourth sensing elements include sensitivity adjustment means so that the centering of the motor vehicle in the lane of travel can be adjusted.

8. A motor vehicle guidance system according to claim 7 wherein said adjustment means comprises potentiometers associated with said third and fourth sensing elements, said potentiometers interconnected for simultaneous opposite sensed movement so that sensitivities can be balanced to center the motor vehicle in the lane of travel.

9. A motor vehicle guidance system according to claim 6 further comprising servo steering means operative in response to said steering signal to steer the motor vehicle.

10. A motor vehicle guidance system according to claim 6 further including vehicle automatic speed control means normally operative to maintain the vehicle at a preselected speed, and operative in response to control signals from said control means to lower the speed of the vehicle in the presence of a detected lowered speed zone.

11. A motor vehicle guidance system according to claim 6 including audible indicator means operably connected to said guidance means for producing an audible signal whose loudness is indicative of the amount of steering correction required to maintain the vehicle within the lane of travel of the roadway.

12. A motor vehicle guidance system as defined in claim 6 further comprising switching means operative to switch said control means to a manual mode in which said control means produces control signals which cause said indicating means to produce indication that the motor vehicle requires a correction in course or speed, or to an automatic mode in which said control means produces control signals causing said indicating means to produce a specific indication that the motor vehicle's course must be corrected to either the right or the left to maintain the vehicle in the lane of travel or that the speed of the motor vehicle must be reduced.

13. A motor vehicle guidance system for use on a roadway having lane marking elements along the edges of the lane of travel and transverse marking elements and also for use on a roadway having lane marking elements within and extending along the lane of travel, both roadway marking systems having transverse marking elements to indicate lowered speed zones, the guidance system comprising:
- first and second sensing means attached to said motor vehicle along the left and right side thereof respectively;
- third and fourth sensing means attached to said motor vehicle intermediate of said first and second sensing means, and spaced apart from each other laterally with respect to the motor vehicle, said first, second, third and fourth sensing means for generating sensing signals indicative of the proximity of the marking elements;
- control means operative in response to sensing signals from the sensing means to produce control signals corresponding to the position of the motor vehicle with respect to the lane of travel and of the presence of a lowered speed zone;
- indicating means operative in response to said control signals to produce an indication to the motor vehicle operator of corrective steering required to maintain the motor vehicle within the lane of travel on said roadway, and of the presence of a lowered speed zone; and
- connecting means selectively operative for use on a roadway having lane-edge marking elements for connecting said first and second sensing means to said control means to produce said control signals corresponding to the position of the motor vehicle with respect to the lane of travel and connecting said third and fourth sensing means to said control means to produce said control signals indicative of the presence of a lowered speed zone, and said connecting means selectively operative for use on a roadway having lane marking elements within the lane of travel for connecting said third and fourth sensing means to said control means to produce said control signals corresponding to the position of the motor vehicle with respect to the lane of travel and connecting said first and second sensing means to said control means to produce said control signals corresponding to the presence of a lowered speed zone.

* * * * *